Figure 1:
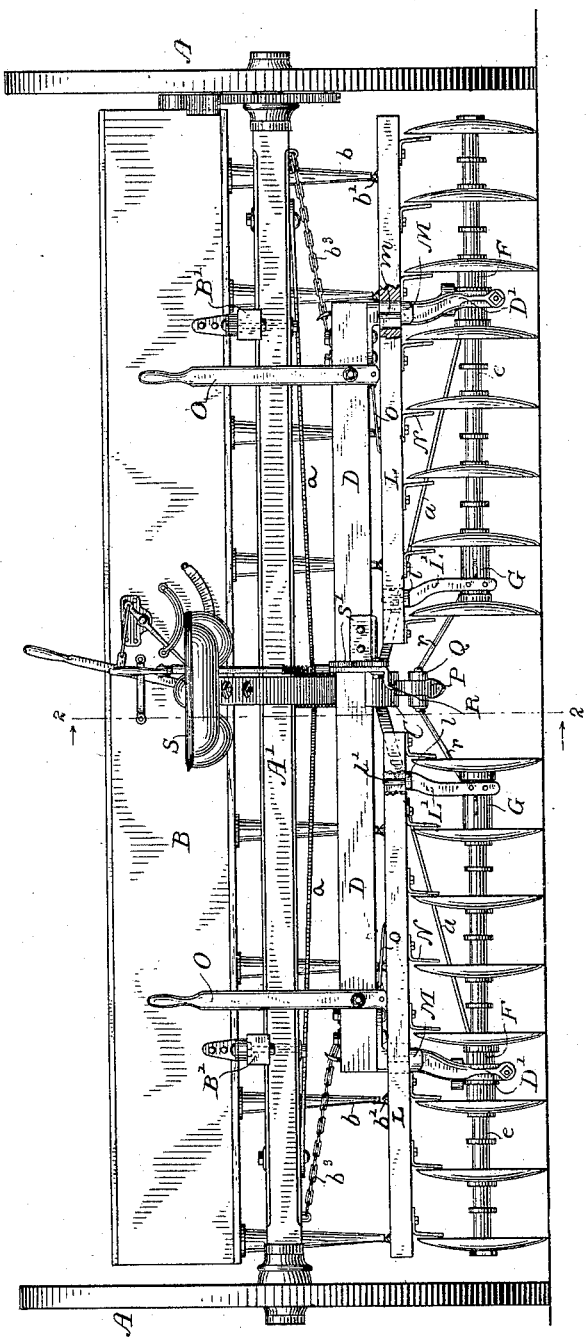

(No Model.) 3 Sheets—Sheet 1.

J. S. CORBIN & A. G. HILL.
COMBINED HARROW AND SEEDER.

No. 312,554. Patented Feb. 17, 1885.

WITNESSES
Wm A. Skinkle
Geo. W. Young

INVENTOR
J. S. Corbin.
Andrew G Hill
By their Attorneys
Baldwin, Hopkins & Peyton

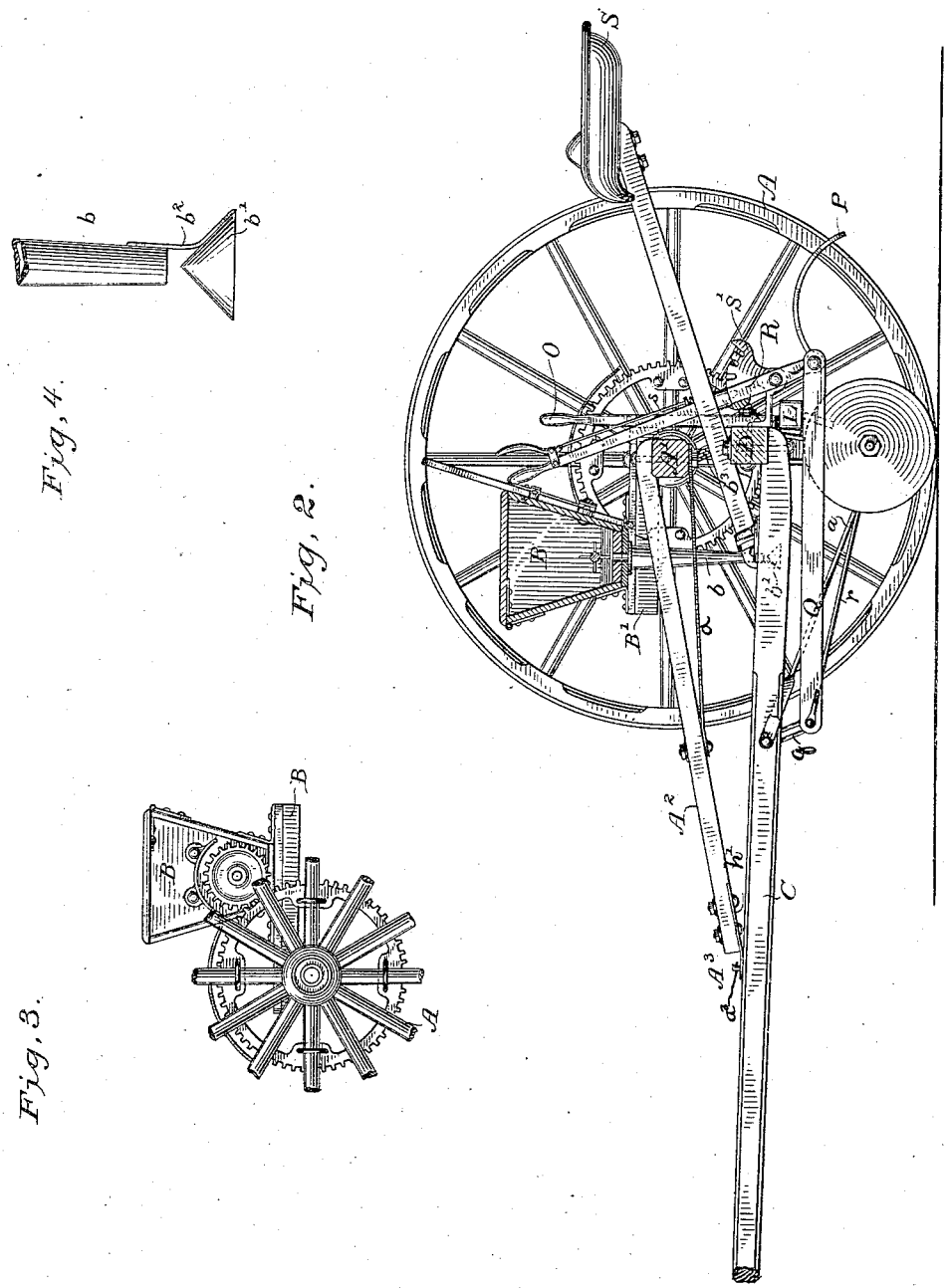

(No Model.) 3 Sheets—Sheet 3.
J. S. CORBIN & A. G. HILL.
COMBINED HARROW AND SEEDER.
No. 312,554. Patented Feb. 17, 1885.
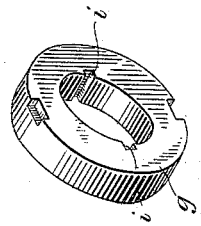
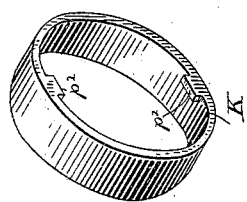
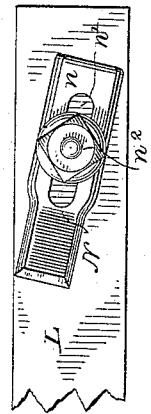
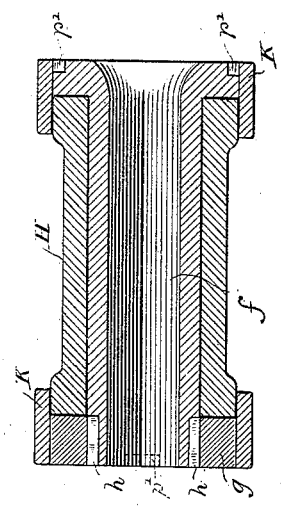
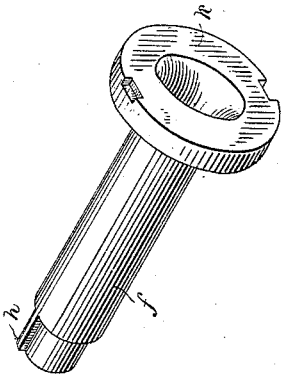
WITNESSES
Wm A. Skinkle
Geo. W. Young
INVENTOR
Jay S. Corbin
Andrew G. Hill
By their Attorneys
Baldwin Hopkins & Peyton

UNITED STATES PATENT OFFICE.

JAY S. CORBIN, OF GOUVERNEUR, NEW YORK, AND ANDREW G. HILL, OF PRESCOTT, ONTARIO, CANADA; SAID HILL ASSIGNOR TO SAID CORBIN.

COMBINED HARROW AND SEEDER.

SPECIFICATION forming part of Letters Patent No. 312,554, dated February 17, 1885.

Application filed March 12, 1884. (No model.)

*To all whom it may concern:*

Be it known that we, JAY S. CORBIN, of Gouverneur, St. Lawrence county, New York, and ANDREW G. HILL, of Prescott, in the Province of Ontario, Dominion of Canada, have invented certain new and useful Improvements in Combined Harrows and Seeders, of which the following is a specification.

Our invention more particularly relates to what are known as rotary cultivators or disk-harrows.

It consists in certain improvements in the construction of some of the parts and in the organization of apparatus by which the machine is more conveniently operated and does more efficient work.

It also consists in an improved arrangement of parts for combining a seed-box and seed-distributing apparatus with the harrow, as also in certain details of construction, which hereinafter more fully appear.

In the accompanying drawings, Figure 1 is a rear elevation; Fig. 2, a transverse section; Fig. 3, a detail view showing the manner of operating the seed-feeding mechanism. Fig. 4 illustrates our improved seed-distributer. Figs. 5, 6, 7, and 8 illustrate in detail our improved thimble and journal-box; and Fig. 9 shows the manner of attaching the scrapers to the scraper-bar.

The harrow part of the machine shown is of the ordinary type, in which opposing independently-rotating gangs of concavo-convex disks are arranged upon opposite sides of the central draft-line.

In machines having seeding devices and gangs of disk-cutters in many kinds of soil the weight of the combined machine becomes so great as to interfere with the proper and advantageous working of the disks, and unduly increases the draft of the machine. To overcome this objection, and produce an efficient and economical machine, we have devised a new organization, involving a sulky or carrying frame for supporting the seeding devices attached to the disk-harrow frame in such manner as not to interfere with the normal operation of the harrow. This sulky-frame consists of two main carrying-wheels, A A, an axle, A', and a short tongue or draft-bar, A², which is attached, as shown in the drawings, to the pole C of the harrow by a connection, A³, which permits of a limited swiveling motion.

To insure proper draft, bars or rods $a\ a$ extend forward from the axle on each side of the short tongue A², and are bolted thereto.

The seed-box B is supported by brackets or beams B' B', which project forward from the axle A' near each carrying-wheel, so as to carry the box in front of the axle. One or both of the wheels A are provided with suitable means—as shown, for instance, in Fig. 3—for operating the feeding or agitating mechanism in the seed-box B.

The seed-box may be provided with any suitable means for feeding and distributing the grain either broadcast or through tubes. We prefer, however, to employ depending tubes $b$, to which are attached distributers $b'$.

The form of our improved distributer is clearly shown in Fig. 4. It is cone-shaped, with its apex just under the mouth of the tube, to which it is secured by a hanger, $b^2$. The contour of the cone may be plain, or it may be provided with longitudinal corrugations, which will distribute the grain with greater uniformity; or it may consist of a half-cone only—as, if the distributer shown in the drawings were divided vertically—or other shaped distributers may be used without departing from the effective manner of operation of our device.

The mechanism for regulating the discharge of the grain is located on the outside of the box, just in front of the driver's seat S, which is mounted on the pole C of the harrow, so as to extend rearwardly therefrom. This mechanism is of an ordinary well-known kind, is merely indicated in the drawings, and needs no description.

The cross-beam D of the harrow is secured to the rear of the pole C, and the disk-gangs are journaled, as usual, in hangers D', and from the journals draft-rods extend forward and are bolted to the tongue C. The chains $b$ secured to the axle A' are removably and adjustably attached to the ends of the cross-beam D. The chains prevent too great lateral motion of the harrow or endwise movement of the gangs relatively to the wheels A, and yet admit of sufficient play to allow the harrow and the seeder-carriage to assume proper relative positions at all times.

For spacing the disks on the gang-shaft, we employ the ordinary thimbles, e, and our improved combined thimble and journal-box, as shown at F and G, and illustrated in detail in Figs. 5 to 8.

Heretofore the box in which the gang-shaft is journaled has been made up of two or more sections bolted together, which were adapted to fit over a double-flanged thimble. This construction is defective, inasmuch as dirt and other foreign matter finds its way inside of the box and destroys the bearing. Our invention seeks to remedy this difficulty by forming the journal-box of one piece of metal and adapting the thimble to readily receive it.

To this end our invention consists in providing a thimble, $f$, formed with a single flange, $k$, and provided at its opposite end with a removable flange or collar, $g$. When the collar $g$ is removed, the journal-box H may readily be slipped over the thimble, and when the journal-box is in position the collar $g$ may be placed on the end of the thimble. The collar is prevented from turning by lugs or ribs $h$ on the end of the thimble, which fit in sockets $i$ in the collar.

Under our improved construction the collar may be formed of metal harder than that of the thimble, and better adapted to resist the wear occasioned by the end-thrusts of the gang. The sand-bands K fit over the flanges of the thimble and over the edges of the journal-box, thereby holding the several parts in position and covering up the junction of the collars and the box. The bands are held in place by lugs $p'$ which fit into corresponding sockets in the flanges, and the whole gang is clamped together by the nut on the end of the gang-shaft, as usual.

The scraper-beams L are supported by standards L', which are bolted to the journal-boxes G$^2$, and are formed at their upper ends with enlarged heads $l$ and studs $l'$, which fit into longitudinal slots in the beams, so as to permit the scrapers to have an endwise movement on the standards relatively to the disks. Toward their outer ends the scraper-beams are supported by brackets M, projecting from the hangers D', and vertical pins or studs $m$ on these brackets work in elongated slots in the beam, substantially as already described.

The depending scrapers N, Fig. 9, are formed with a horizontal plate, $n$, for attaching them to the under sides of the beams. This plate is provided with a longitudinal slot, $n'$, in which a clamping-bolt, $n^2$, works. By this arrangement the scrapers may be independently adjusted to and from the disks, which is very desirable, inasmuch as the disks cannot always be made to run true. The levers O, for operating the scrapers, are pivoted on the cross-beam D, and are connected with the scraper-beams by hinge or swivel-links $o$, which permit the scraper-beams to swing with the gangs without straining the levers.

Heretofore the levers have been mounted on the scraper-beams, which is objectionable, because in certain positions of the gangs the levers are out of reach of the driver. We obviate this difficulty by mounting the levers on the cross-beam of the harrow in a permanent position relatively to the driver's seat.

In order to cultivate the strip of soil left between the disk-gangs, we employ a central cultivating or harrowing tooth, P. This tooth is secured to the end of the lever R, pivoted to a bracket, S', on the rear of the cross-beam D, by which the angle of the gangs is adjusted, as will be described. The end of this lever is pivoted to a bar, Q, which extends forward, and is attached at its forward end to the pole C by a swinging link, $q$. The bracket S' is preferably secured to the cross-beam D, and is provided with a notched sector for the detent $s$. By thus locating the lever in rear of the gangs and in front of the driver's seat it is within convenient reach of the driver from his seat on the machine, and enables him to exert his entire weight on it, and yet is out of the way of the seed-box. We deem this a decided improvement on those machines in which the lever is located in rear of the seat or at its side. The forward end of the bar Q is connected with the disk-gangs by adjusting-rods $r$, so that by operating the lever R the angle of the gangs will be varied. The same movement of the lever that sets the disks at a proper angle lowers the spring-tooth into working position, while the reverse movement of the lever, which straightens the disks for transportation, elevates the tooth.

The seeder frame or sulky is so connected to the harrow that when the disk-gangs are parallel they will be in the same vertical plane with the axle of the seeder, or nearly so. By this arrangement the machine is readily turned without twisting any of the parts.

The seeder-frame may be readily separated from the harrow by disconnecting the chains $b^3$ and disengaging the eye-plate $h'$ from the stud $a^3$.

The principle of our invention may doubtless be varied in detail in many respects without departing therefrom.

We claim as our invention—

1. The combination, substantially as set forth, of the harrow, the seeder-sulky, the laterally-swiveling pivoted draft-connection between the harrow and seeder frames, located in advance of the sulky and harrow proper, and the connections between the harrow and seeder frames for limiting the lateral play or vibration of the sulky and harrow relatively to each other.

2. The combination, substantially as set forth, of the harrow, the pole or tongue of the harrow, the seeder-sulky, the laterally-swiveling draft-connection between the pole of the harrow and the seeder-sulky, and the connections between the harrow and sulky for limiting the lateral play or vibration of the sulky and harrow relatively to each other.

3. The combination, substantially as set forth, of the harrow-frame, the disk-gangs carried thereby, and a lever for adjusting the gangs to vary their angle to the line of draft, located in the rear of the gangs and in front of the driver's seat.

4. The combination, substantially as set forth, of the seeder-sulky, the seed-box carried thereby, the harrow-frame, with which the seeder-sulky is connected, the disk-gangs arranged in rear of the seed-box, and a lever for varying the angle of the gangs relatively to the line of draft, also in rear of the seed-box in front of the driver's seat.

5. The combination, substantially as set forth, of the harrow-frame, the disk-gangs, the adjusting-lever pivoted at or about the rear of the draft-pole, the swinging link pivoted on the tongue, the rod connecting the adjusting-lever and link, and the rods which connect the link and the disk-gangs.

6. The combination, substantially as set forth, of the harrow-frame, the opposing disk-gangs carried thereby, arranged on opposite sides of the pole or central draft-line, a lever for adjusting the angle of the gangs relatively to the line of draft, located substantially between the adjoining ends of the opposing gangs, and the cultivating or harrow tooth, also operated by said lever to cut out the space between the gangs.

7. The combination, substantially as set forth, of the harrow-frame, the disk-gangs carried thereby and arranged on opposite sides of the central line, a lever pivoted on the frame, and a harrow or cultivating tooth carried on the end of the lever so as to be raised or lowered to cut out the space between the gangs.

8. The combination, substantially as set forth, of the harrow-frame, the disk-gangs arranged on opposite sides of the central line, the adjusting-lever pivoted at the rear of the frame or pole, the swinging link pivoted on the pole in front of the gangs, the rod connecting the adjusting-lever and said link, the rods connecting the disk-gangs and said link, and the cultivating or harrow tooth connected with and actuated by said lever.

9. The combination, substantially as set forth, of the pole, the opposing gangs, the cultivating harrow-tooth located between the gangs, and the lever to which the tooth is rigidly attached, and by which it is adjusted both vertically and horizontally.

10. The combination, substantially as set forth, of the harrow-frame, the disk-gangs carried thereby, scraper-beams carried above the disk-gangs, levers for operating the scraper-beams pivoted on the frame of the harrow in permanent relation to the driver's seat, and swiveling or yielding connections between the scraper-beams and said levers.

11. The combination, substantially as set forth, of the disk-gang, the scraper-beam, the supports on which it is mounted so as to move with the gang when its angle to the line of draft is changed, a lever for reciprocating the beam pivoted on the frame of the harrow in permanent relation to the driver's seat, and a swivel-connection between said lever and scraper-beam.

12. The combination, substantially as set forth, of the frame, the disk-gang, the slotted scraper-beam, the scraper-beam support rigidly mounted upon the disk-gang, the scraper-beam supporting-bracket carried by the hanger, the adjusting-lever pivoted upon the frame, and the swivel-connection between said lever and the beam.

13. The combination, substantially as set forth, of the gang of cutting-disks, the scraper-beam, a series of scrapers (one for each disk) carried by said beam, and means for independently adjusting each scraper toward and from the disk and laterally thereto.

14. The combination, substantially as set forth, of the disks, the scrapers, the scraper-support, and devices for adjustably securing the scrapers to their support, whereby they may be adjusted toward and from the disks and laterally thereto.

15. The herein-described spacing-thimble, having an outwardly-projecting flange formed on one end, and an outwardly-projecting removable flange on the other end, for the purpose specified.

16. The combination, substantially as set forth, of the spacing-thimble, its removable flange or collar, and the sectionless journal-box that is held in position by the collars.

17. The herein-described spacing-thimble, formed with an outwardly-projecting flange on one end and a removable flange on the other end, formed of harder metal than the body of the thimble.

18. The combination, substantially as set forth, of the spacing-thimble, its removable flange or collar, the sectionless journal-box that fits over the thimble, and the sand-bands which fit on the flanges of the thimble and over the ends of the journal-box.

19. The combination, substantially as set forth, of a disk-gang, an endwise-moving scraper-beam or scraper-support which reciprocates in a uniform horizontal plane, and scrapers secured thereto so that they move bodily with the beam toward and from the disks in a uniform horizontal plane.

In testimony whereof we have hereunto subscribed our names this 29th day of November, A. D. 1883.

JAY S. CORBIN.
ANDREW G. HILL.

Witnesses:
JAMES YOUNG,
LLOYD B. WIGHT.